United States Patent
Iwatsu (10) Patent No.: US 9,747,529 B2
(45) Date of Patent: Aug. 29, 2017

(54) SEQUENCE PROGRAM CREATION DEVICE

(75) Inventor: Satoshi Iwatsu, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 511 days.

(21) Appl. No.: 14/385,233

(22) PCT Filed: Mar. 19, 2012

(86) PCT No.: PCT/JP2012/057008
§ 371 (c)(1),
(2), (4) Date: Sep. 15, 2014

(87) PCT Pub. No.: WO2013/140497
PCT Pub. Date: Sep. 26, 2013

(65) Prior Publication Data
US 2015/0094829 A1  Apr. 2, 2015

(51) Int. Cl.
*G05B 19/42* (2006.01)
*G06K 9/80* (2006.01)
*G05B 19/05* (2006.01)

(52) U.S. Cl.
CPC ............. *G06K 9/80* (2013.01); *G05B 19/056* (2013.01); *G05B 2219/13004* (2013.01); *G05B 2219/13052* (2013.01); *Y02P 90/265* (2015.11)

(58) Field of Classification Search
CPC ......... G06F 17/30858; G06F 17/30011; G06F 17/3025; G06F 17/30017; G06K 9/6857;
(Continued)

(56) References Cited

U.S. PATENT DOCUMENTS 6,182,069 B1 * 1/2001 Niblack ............. G06F 17/3025
7,536,711 B2    5/2009 Miyashita et al.
(Continued)

FOREIGN PATENT DOCUMENTS

JP   05-061509 A   3/1993
JP   05-181510 A   7/1993
(Continued)

OTHER PUBLICATIONS

International Search Report of PCT/JP2012/057008 dated May 15, 2012.

*Primary Examiner* — Tuan Vu
(74) *Attorney, Agent, or Firm* — Sughrue Mion, PLLC; Richard C. Turner (57) ABSTRACT

A sequence program creation device includes a search-key-circuit specification unit specifying a search key circuit; a search-area specification unit specifying a search area for searching for a circuit similar to the search key circuit; a search-index specification unit specifying an index in a process of calculating a similarity to the search key circuit; a similarity calculation unit calculating a similarity to the search key circuit, based on the index, for each circuit included in the search area; a search-target-part determination unit determining whether the similarity is equal to or more than a predetermined threshold for each circuit for which the similarity calculation unit has calculated the similarity; and a search-result display-screen display unit displaying on a search-result display screen a circuit whose similarity is determined to be equal to or more than the predetermined threshold by the search-target-part determination unit.

5 Claims, 8 Drawing Sheets

(58) Field of Classification Search
CPC ........ G06K 9/80; G06T 3/4053; H04N 19/70; Y10S 707/99934
See application file for complete search history.

(56) References Cited

U.S. PATENT DOCUMENTS

| | | |
|---|---|---|
| 7,725,923 B2 | 5/2010 | Miyashita et al. |
| 2003/0067637 A1* | 4/2003 | Hannuksela ........... H04N 19/70 358/504 |
| 2008/0126345 A1* | 5/2008 | Podilchuk ............ G06K 9/6857 |
| 2008/0313140 A1* | 12/2008 | Pereira .............. G06F 17/30858 |
| 2009/0006378 A1* | 1/2009 | Houle ............... G06F 17/30011 |
| 2010/0329578 A1* | 12/2010 | Hatasawa ............. G06T 3/4053 382/218 |

FOREIGN PATENT DOCUMENTS

| | | |
|---|---|---|
| JP | 08-255014 A | 10/1996 |
| JP | 10-063309 A | 3/1998 |
| JP | 2004-259084 A | 9/2004 |
| JP | 2005-339150 A | 12/2005 |
| JP | 2006-024179 A | 1/2006 |
| JP | 2006-120070 A | 5/2006 |
| JP | 2011-113254 A | 6/2011 |

* cited by examiner

SEQUENCE PROGRAM CREATION DEVICE

CROSS REFERENCE TO RELATED APPLICATIONS

This is a National Stage of International Application No. PCT/JP2012/057008 filed Mar. 19, 2012, the contents of which are incorporated herein by reference in its entirety.

FIELD

The present invention relates to a sequence program creation device.

BACKGROUND

Generally, a sequence program is created by graphically arranging constituent elements of a program on an editor screen by using a program editor. Particularly, a ladder program, which is one of such sequence programs, is configured by circuit blocks. The circuit blocks are created by arranging circuit elements (such as contacts, coils, commands, and functional blocks) as the constituent elements thereof on the editor screen of the program editor.

At the time of editing a ladder program by a program editor, upon specification of a search key, a similar part search is selected from a menu, and then program parts similar to the search key can be displayed on a search display screen. As a user selects an intended program part from the displayed search results and drags and drops the selected program part on an editor screen, the program parts are arranged on the ladder program.

Patent Literature 1 discloses a technique in which a circuit satisfying conditions and all circuit elements specified in the same circuit is identified and the identified circuit is displayed.

CITATION LIST

Patent Literature

Patent Literature 1: Japanese Patent Application Laid-open No. H05-061509

SUMMARY

Technical Problem

However, in the conventional technique, a search is not performed while considering whether the circuit has a logical or graphical similarity. Therefore, there is a case where, although all the specified circuit elements and conditions are satisfied, a circuit that is completely different logically or graphically is displayed as a search result. On the other hand, a circuit that is logically or graphically similar but not all the specified circuit elements and conditions are satisfied is not displayed as the search result. In this manner, in the conventional technique, it is difficult to provide an effective programming environment under various conditions.

The present invention has been achieved in view of the above problems, an object of the present invention is to provide a sequence program creation device that can search for a program part while considering logical or graphical similarities.

Solution to Problem

In order to solve the above problems and achieve the object, the present invention is a sequence program creation device that creates a sequence program by graphically arranging constituent elements of a program on an editor screen, including: a search-key-circuit specification unit that specifies a search key circuit; a search-area specification unit that specifies a search area for searching for a circuit similar to the search key circuit; a search-index specification unit that specifies at least one of a graphical similarity to the search key circuit, a logical similarity to the search key circuit, and a keyword similarity related to the search key circuit as an index in a process of calculating a similarity to the search key circuit; a similarity calculation unit that calculates a similarity to the search key circuit specified by the search-key-circuit specification unit, on a basis of the index specified by the search-index specification unit, for each circuit included in the search area specified by the search-area specification unit; a search-target-part determination unit that determines whether the similarity is equal to or more than a predetermined threshold for each circuit for which the similarity calculation unit has calculated the similarity; and a search-result display-screen display unit that displays on a search-result display screen a circuit whose similarity is determined to be equal to or more than the predetermined threshold by the search-target-part determination unit.

Advantageous Effects of Invention

The sequence program creation device according to the present invention has an effect where it is possible to perform a search for a program part while considering logical or graphical similarities.

DESCRIPTION OF EMBODIMENTS

Exemplary embodiments of a sequence program creation device according to the present invention will be explained below in detail with reference to the drawings. The present invention is not limited to the embodiments.

Embodiment

Figure 1:
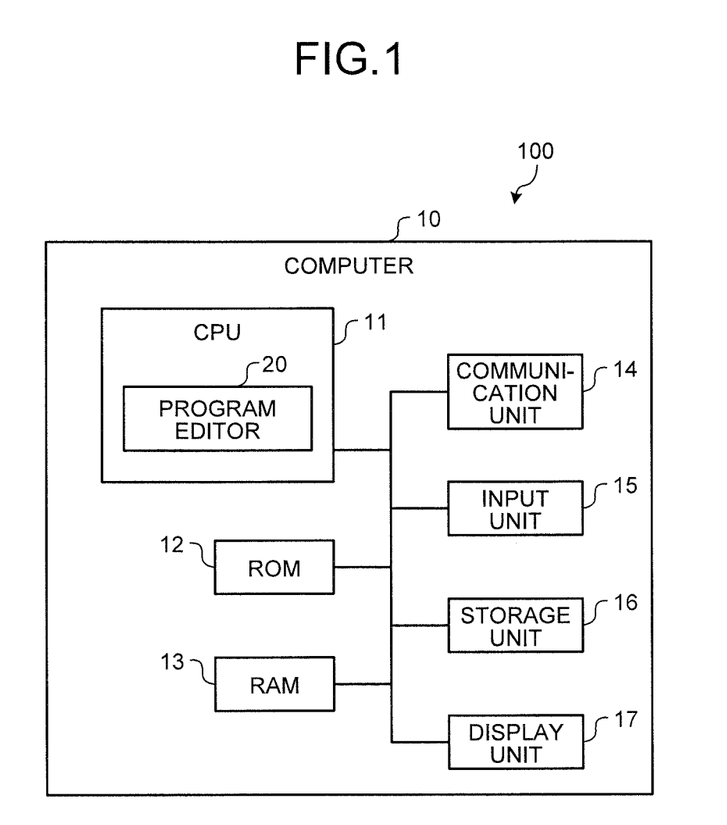
FIG. 1 is a diagram illustrating the configuration of a sequence program creation device according an embodiment of the present invention.

FIG. 1 is a diagram illustrating the configuration of a sequence program creation device according an embodiment of the present invention. A sequence program creation device 100 according to the present embodiment is configured such that a computer 10 including a CPU (Central Processing Unit) 11, a ROM (Read Only Memory) 12, a RAM (Random Access Memory) 13, a communication unit 14, an input unit 15, a storage unit 16, and a display unit 17 executes software, and forms a program editor 20 on the CPU 11. The CPU 11 executes a program stored in the ROM 12 or the storage unit 16 while using the RAM 13 as a working area. The communication unit 14 is a communication interface for transmitting and receiving data to and from an external device, and is used at the time of transmitting a created sequence program and writing the sequence program in a PLC. The input unit 15 is a user interface such as a keyboard and a pointing device. The storage unit 16 is a storage device that stores therein information in a nonvolatile manner, and an HDD (Hard Disk Drive), a semiconductor memory, or the like can be applied as the storage unit 16. The display unit 17 is a device that displays a screen of various types (an editor screen, a search result display screen, and the like) while creating the sequence program, and an LCD (Liquid Crystal Display), an organic EL (Electro-Luminescence) display, or the like can be applied as the display unit 17.

Figure 2:
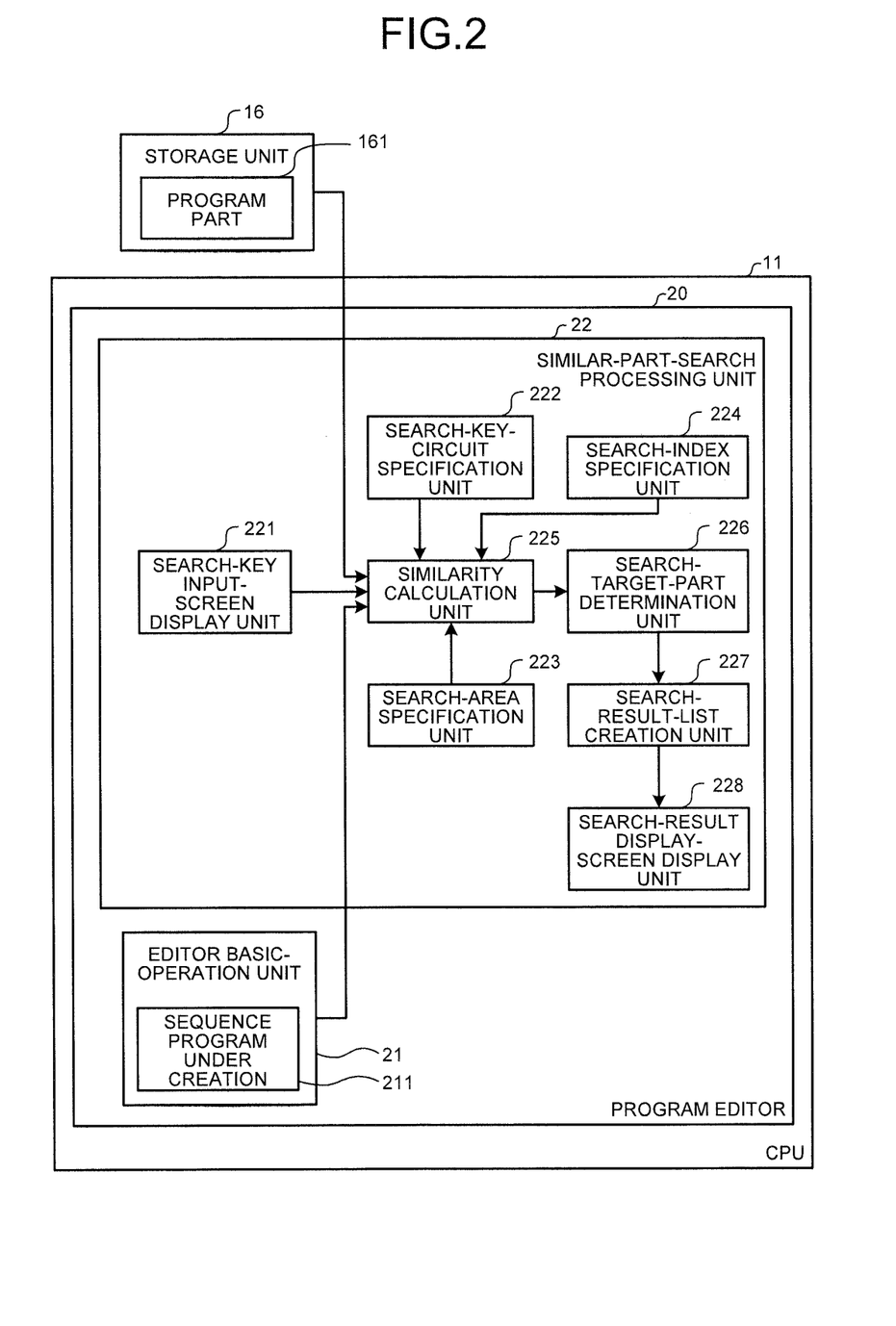
FIG. 2 is a block diagram of the functional configuration of a program editor.

FIG. 2 is a block diagram of the functional configuration of a program editor. The program editor 20 includes an editor basic-operation unit 21 and a similar-part-search processing unit 22. The similar-part-search processing unit 22 includes a search-key input-screen display unit 221, a search-key-circuit specification unit 222, a search-area specification unit 223, a search-index specification unit 224, a similarity calculation unit 225, a search-target-part determination unit 226, a search-result-list creation unit 227, and a search-result display-screen display unit 228. Each of the functional units (the editor basic-operation unit 21 and the similar-part-search processing unit 22) of the program editor 20 is realized on the CPU 11 by software processing. The editor basic-operation unit 21 has the same function as that of a general program editor and displays an editor screen on the display unit 17. In the editor screen displayed on the display unit 17, circuit elements are graphically arranged by operations to the input unit 15, thereby creating the sequence program.

The search-key input-screen display unit 221 displays a search-key input screen on the display unit 17. Similarly to a normal editor screen, the search-key input screen is a screen in which circuit elements can be arranged on the grid, and a circuit configured by the circuit elements arranged on the grid by operations performed by a user to the input unit 15 is a search key circuit. The "circuit" in this description is at least part of a program and includes at least one circuit element. The circuit does not need to be an assembled part having any meaning like a program part. However, the program part itself can be used as the search key circuit. The search-key-circuit specification unit 222 specifies as the search key circuit any of a part of a sequence program 211 under creation, which is already arranged on the editor screen, an existing program part 161 stored in the storage unit 16, and a circuit edited in the search-key input screen that the search-key input-screen display unit 221 has caused the display unit 17 to display. The search-area specification unit 223 specifies whether its search is a search from the existing program parts 161 stored in the storage unit 16 or a search from a program under creation (the sequence program 211 under creation held by the editor basic-operation unit 21).

The search-index specification unit 224 specifies an index to be used (a graphical similarity, a logical configuration similarity (a logical similarity), and a keyword similarity) at the time of searching a search area for a circuit similar to the search key circuit. Definitions of the graphical similarity, the logical similarity, and the keyword similarity are described later. The search-index specification unit 224 can also specify a plurality of indexes. The similarity calculation unit 225 calculates the similarity to the search key circuit as to the search area (the program parts 161 stored in the storage unit 16 or the sequence program 211 under creation held by the editor basic-operation unit 21) specified by the search-area specification unit 223. When a plurality of search indexes are specified by the search-index specification unit 224, the similarity calculation unit 225 sums up the similarities according to the indexes to calculate the similarity of the search target part.

The search-target-part determination unit 226 determines whether the similarity to the search key circuit is equal to or more than a predetermined threshold, and extracts circuits having similarities equal to or more than the predetermined threshold. When it is specified that a search is performed of the existing program parts 161 stored in the storage unit 16 as a search area, the search-result-list creation unit 227 creates a list of program parts that include the circuits extracted by the search-target-part determination unit 226. The search-result display-screen display unit 228 causes the display unit 17 to display a list of the program parts created by the search-result-list creation unit 227 as a search-result display screen.

The search index is explained here. The graphical similarity is a similarity obtained by quantifying a graphical arrangement among circuit elements (relative positional relationships between the top, bottom, left, and right thereof), connection relationship (the presence or absence of direct connection), distance (the number of circuit elements therebetween), and the like. The logical similarity is a similarity obtained by quantifying the order of appearance of commands, labels, device addresses, and the like that are included in the circuit element, and the same value is logically obtained for circuits by normalization. The keyword similarity is a similarity obtained by quantifying the number (rate) of keywords matching between keywords registered in a search key circuit and keywords registered in a search target circuit.

Figure 3:
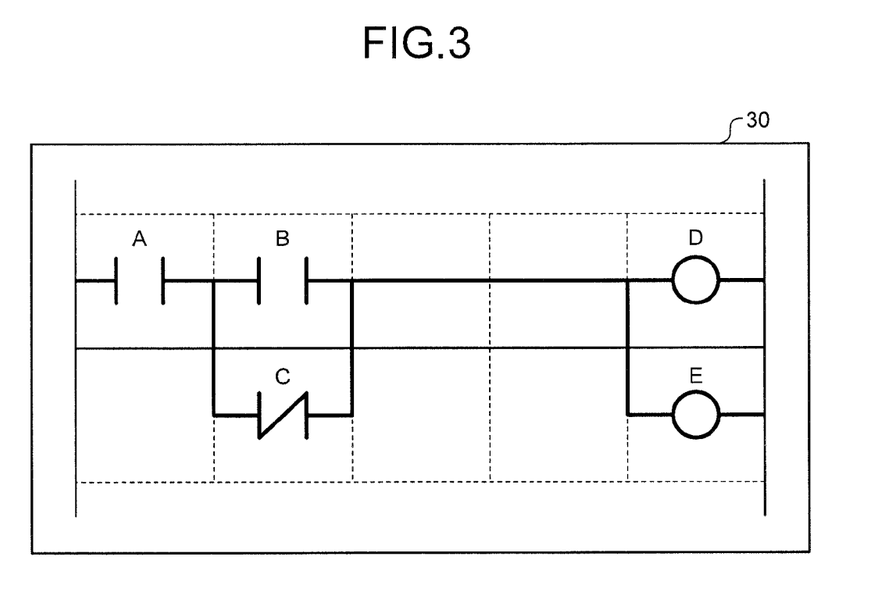
FIG. 3 is a diagram illustrating an example of a search key circuit.
Figure 4:
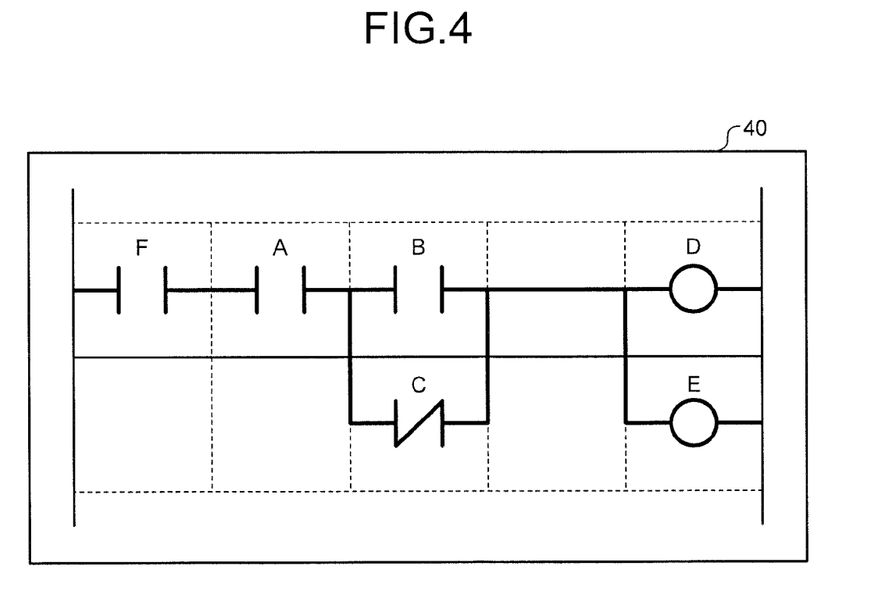
FIG. 4 is a diagram illustrating an example of a search target circuit.

A procedure for calculating a graphical similarity and a logical similarity by the similarity calculation unit 225 is explained here. FIG. 3 is a diagram illustrating an example of a search key circuit. FIG. 4 is a diagram illustrating an example of a search target circuit. First, a process for calculating a graphical similarity between a search key circuit 30 and a search target circuit 40 by the similarity calculation unit 225 is explained.

The search key circuit 30 includes, as elements thereof, two A contacts (elements A and B), one B contact (an element C), and two coils (elements D and E). On the right side of one A contact (the element A), another A contact (the element B) is arranged. On the lower side of the A contact (the element B), on the left side of which another A contact (the element A) is arranged, the B contact (the element C) is arranged. Furthermore, on the lower side of one coil (the element D), another coil (the element E) is arranged. Further, as a mode of direct connection by wire connection, the elements A and B are connected. Further, the elements A and C are connected, the elements B and D are connected, the elements B and E are connected, the elements C and D are connected, and the elements C and E are connected.

The search target circuit 40 includes, as elements thereof, three A contacts (the elements A and B and an element F), one B contact (the element C), and two coils (the elements D and E). On the right side of one A contact (the element F), another A contact (the element A) is arranged. On the right side of the A contact (the element A), on the left side of which another A contact (the element F) is arranged, still another A contact (the element B) is arranged. On the lower side of the A contact (the element B), on the left side of which the two A contacts (the elements F and A) are arranged, the B contact (the element C) is arranged. Furthermore, on the lower side of one coil (the element D), another coil (the element E) is arranged. Further, as a mode of direct connection by wire connection, the elements A and B are connected. Further, the elements A and C are connected, the elements B and D are connected, the elements B and E are connected, the elements C and D are connected, the elements C and E are connected, and the elements F and A are connected.

All of the five elements (the elements A, B, C, D, and E) of the search key circuit 30 match the six elements (the elements A, B, C, D, E, and F) of the search target circuit 40. Therefore, the similarity calculation unit 225 calculates the similarity related to the presence of these elements as 5/6.

All of the positional relationships (the element B is on the right side of the element A, the element C is on the lower side of the element B, and the element E is on the lower side of the element D) between adjacent elements of the search key circuit 30 match the positional relationships (the element A is on the right side of the element F, the element B is on the right side of the element A, the element C is on the lower side of the element B, and the element E is on the lower side of the element D) between adjacent elements of the search target circuit 40. Therefore, the similarity calculation unit 225 calculates the similarity related to the positional relationships between these adjacent elements as 3/4.

All of the relationships (the element A and the element B, the element A and the element C, the element B and the element D, the element B and the element E, the element C and the element D, and the element C and the element E) of direct connection by wire connection in the search key circuit 30 match the relationships (the element A and the element B, the element A and the element C, the element B and the element D, the element B and the element E, the element C and the element D, the element C and the element E, and the element F and the element A) of direct connection by wire connection in the search target circuit 40. Therefore, the similarity calculation unit 225 calculates the similarity related to the relationship of the direct connection by wire connection as 6/7.

The similarity calculation unit 225 multiplies the similarity related to the presence of elements, the similarity related to the positional relationship between adjacent elements, and the similarity related to relationship of direct connection by wire connection, and calculates the overall graphical similarity. In the above example, $5/6 \times 3/4 \times 6/7 = 15/28 \approx 0.54$ is established, so that the graphical similarity between the search key circuit 30 and the search target circuit 40 is calculated as 0.54.

The above example is one example of a method for calculating a graphical similarity, and a reference (for example, a distance difference between respective circuit elements) different from the above example can be used for calculations of the graphical similarity.

Figure 5:
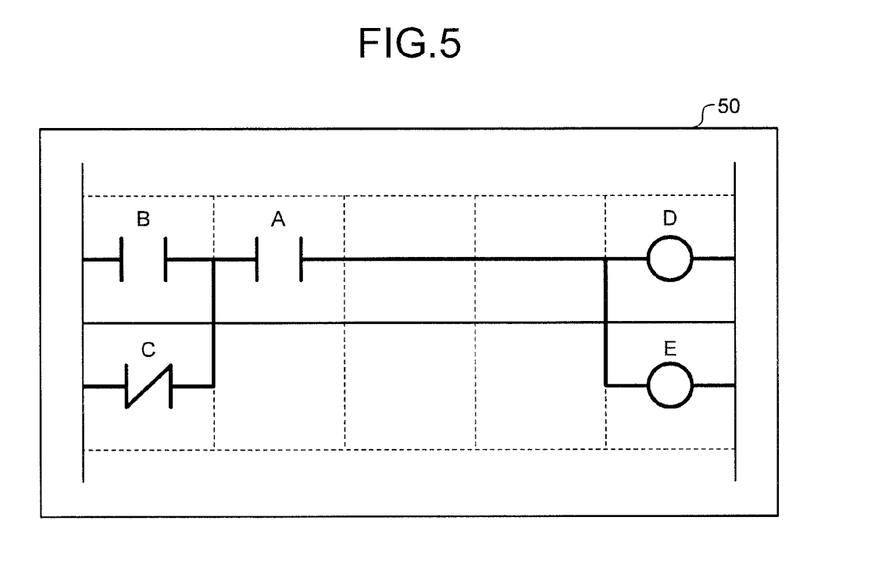
FIG. 5 is a diagram illustrating another example of a search target circuit.

Next, a process for calculating a logical similarity between the search key circuit 30 and the search target circuit 40 by the similarity calculation unit 225 is explained. FIG. 5 is a diagram illustrating another example of a search target circuit. A search target circuit 50 includes, as elements thereof, two A contacts (elements A and B), one B contact (an element C), and two coils (elements D and E). On the right side of one A contact (the element B), another A contact (the element A) is arranged. Furthermore, on the lower side of the A contact (the element B), on the right side of which another A contact (the element A) is arranged, the B contact (the element C) is arranged. Furthermore, on the lower side of one coil (the element D), another coil (the element E) is arranged. Further, as a mode of direct connection by wire connection, the elements B and A are connected, the elements C and A are connected, the elements A and D are connected, and the elements A and E are connected.

The order of appearance of respective circuit elements in the search target circuit 50 is BCADE. On the other hand, the order of appearance of respective circuit elements in the search key circuit 30 is ABCDE. The order of appearance of two circuit elements (D and E) of five circuit elements matches each other, and therefore the logical similarity is calculated as 2/5=0.40 when the comparison is simply performed. Note that the similarity calculation unit 225 has a function of normalizing a circuit. In the search target circuit 50, even if the order of the element A and the parallel part of the elements B and C is reversed, the search target circuits 50 before and after the reversal of the order are logically equivalent to each other. Therefore, the similarity calculation unit 225 reverses the order of the element A and the parallel part of the elements B and C to calculate a logical similarity. The order of the appearance of circuit elements in the circuit in which the order of the element A and the parallel part of the elements B and C is reversed is ABCDE, and the order matches the order of the appearance of the circuit elements in the search key circuit 30. Accordingly, when a normalization process is performed, the logical similarity is calculated as 5/5=1.0.

Figure 6:
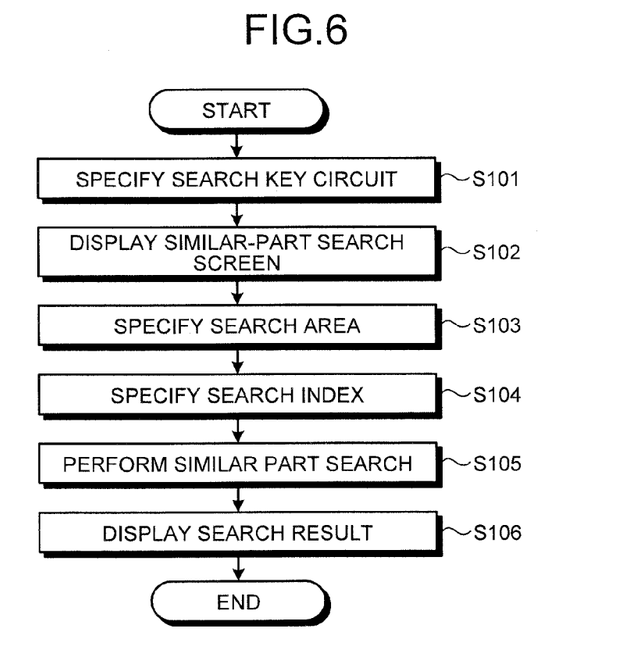
FIG. 6 is a flowchart illustrating the flow of a similar-part search process performed by the sequence program creation device according to the embodiment.
Figure 7:
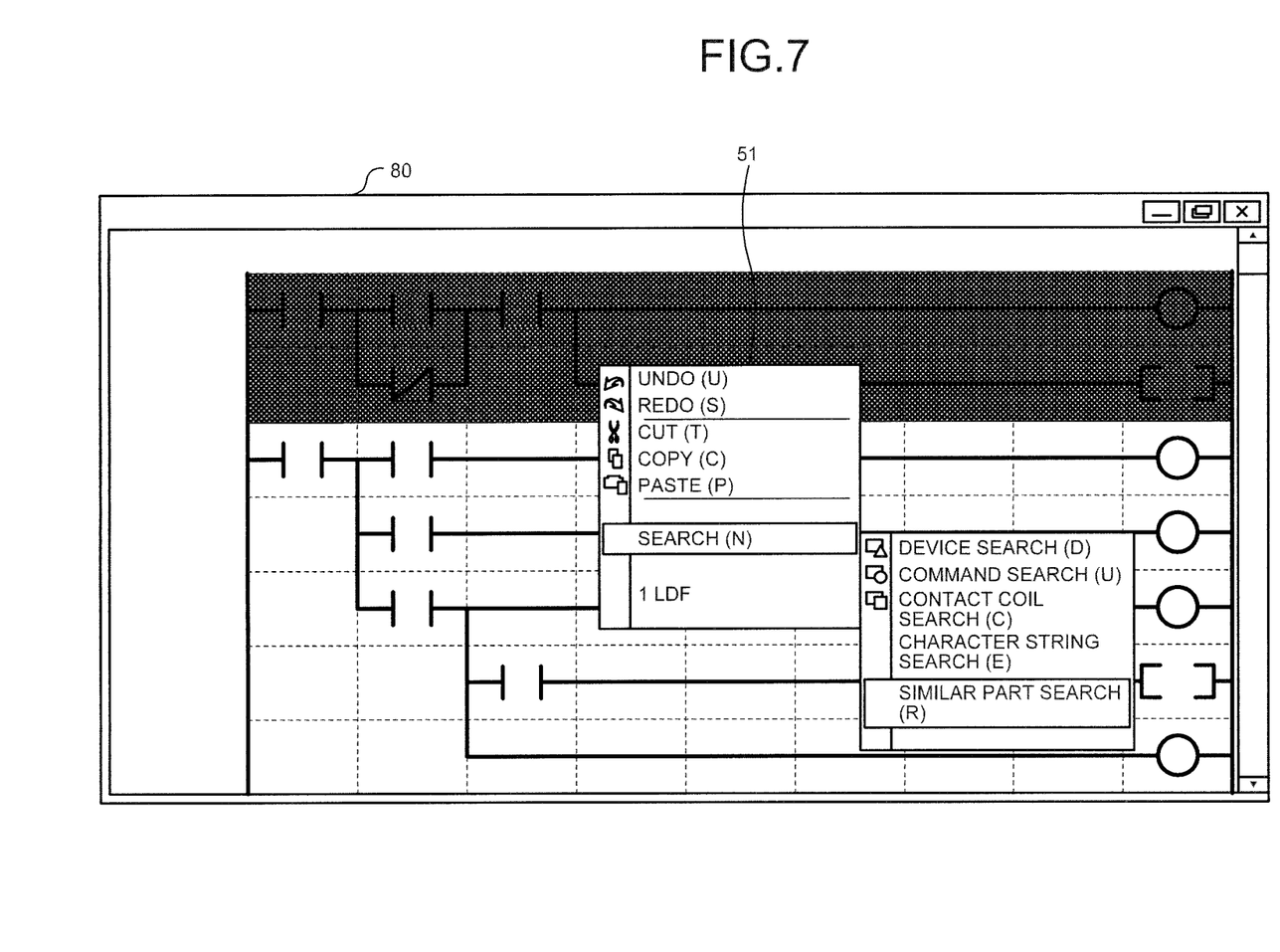
FIG. 7 is a diagram illustrating an example of a screen displayed on a display unit during the similar-part search process.

Operations of the sequence program creation device according to the present embodiment are explained here. FIG. 6 is a flowchart illustrating the flow of a similar-part search process performed by the sequence program creation device according to the present embodiment. FIG. 7 is a diagram illustrating an example of a screen displayed on a display unit during the similar-part search process. First, a user performs an operation to the input unit 15 and specifies a search key circuit (Step S101). At this time, when part of a program under creation is regarded as the search key, the part of the created program is selected and specified on an editor screen. As shown in FIG. 7, for example, at least part of a ladder program displayed on a grid-like editor screen 80 is selected by the operation to the input unit 15. In FIG. 7, part selected by the operation to the input unit 15 is shown by hatching. Furthermore, when the program part stored in the storage unit 16 is regarded as the search key circuit, a program part similar to the target program part is selected by the operation to the input unit 15 from the list of the program parts created in the past. Further, when the circuit edited in the search-key input screen that the search-key input-screen display unit 221 causes the display unit 17 to display is regarded as the search key circuit, an operation for editing the search key circuit in the search-key input screen is performed to the input unit 15.

Figure 8:
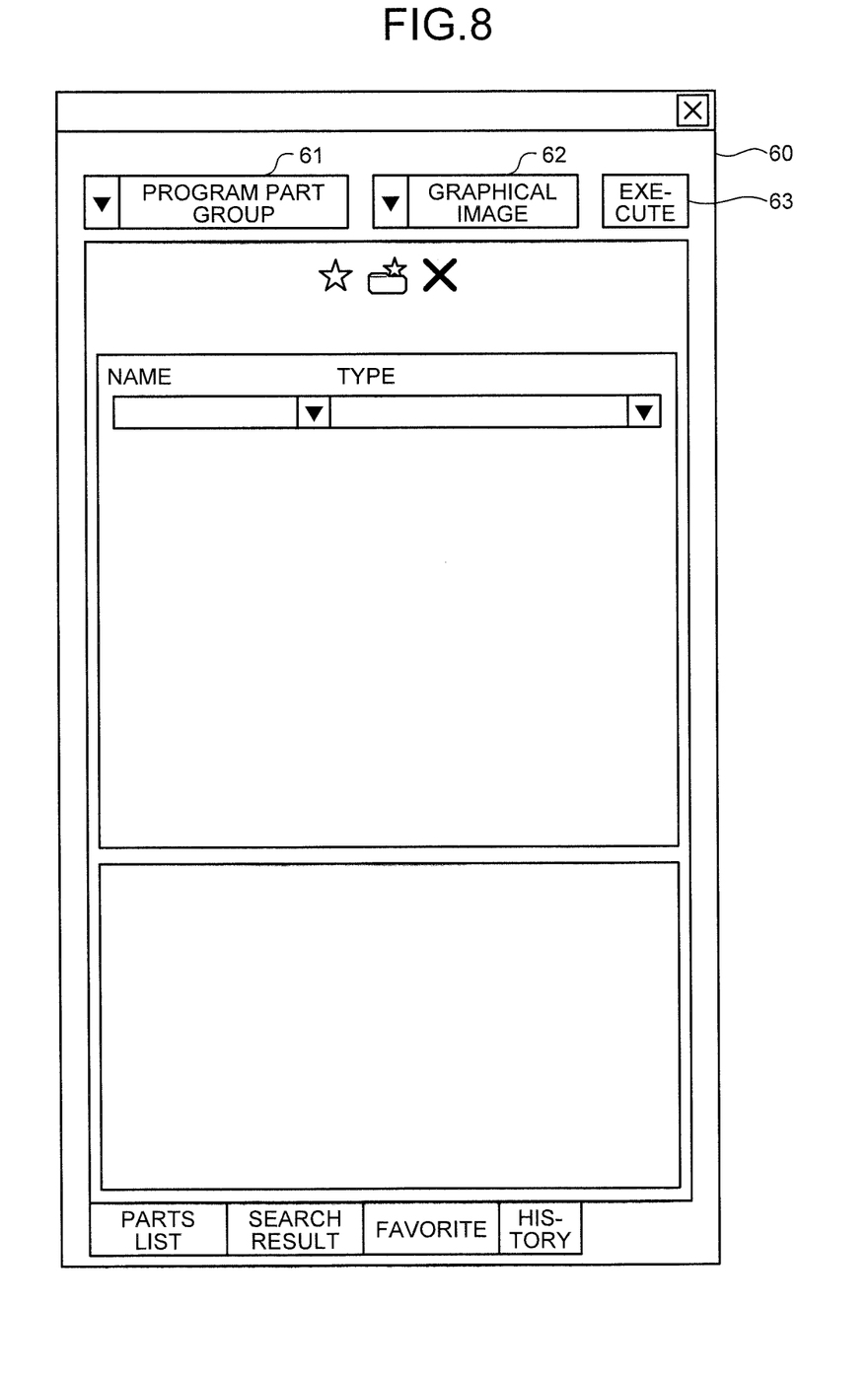
FIG. 8 is a diagram illustrating an example of a similar-part search screen.
Figure 9:
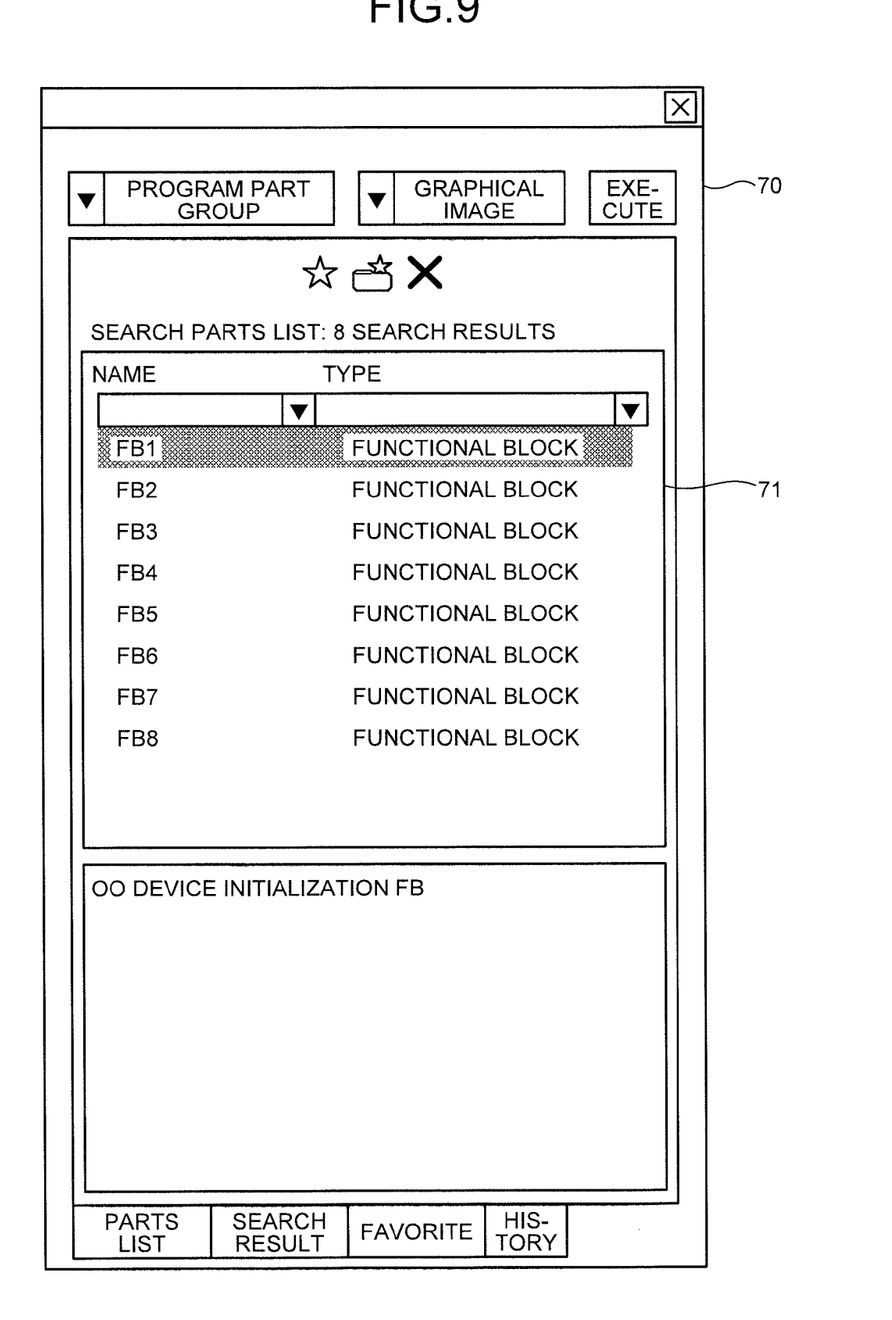
FIG. 9 is a diagram illustrating an example of a search-result display screen.

Next, the user performs an operation (as shown in FIG. 7, for example, selects "similar part search" from a menu 51) to the input unit 15 and causes the display unit 17 to display a similar-part search screen (Step S102). FIG. 8 is a diagram illustrating an example of a similar-part search screen. A similar-part search screen 60 includes a search-area specification field 61 and a search-index specification field 62. Thereafter, by the operation to the input unit 15, the user specifies a search area in the search-area specification field 61 on the similar-part search screen 60 (Step S103). Furthermore, by the operation to the input unit 15, the user specifies a search index in the search-index specification field 62 on the similar-part search screen 60 (Step S104). After the search index is specified, as the user performs an operation to the input unit 15 and presses a search execution button 63 on the similar-part search screen 60, the similar-part-search processing unit 22 performs a similar part search (Step S105) and causes the display unit 17 to display a search result (Step S106), and the process is ended. FIG. 9 is a diagram illustrating an example of a search-result display screen, and is a screen example in a case where it is specified that a search is performed of the existing program parts 161 stored in the storage unit 16 as the search area. On a search-result display screen 70, a list 71 of program parts that include circuits whose similarities to the search key circuit are equal to or more than a threshold is displayed. It is possible to additionally display values of similarities of the circuits included in the program parts on the search-result display screen 70. By additionally displaying the similarities on the search-result display screen 70, the user can use the displayed similarities as a reference to determine whether the program parts of the search result are utilized.

Figure 10:
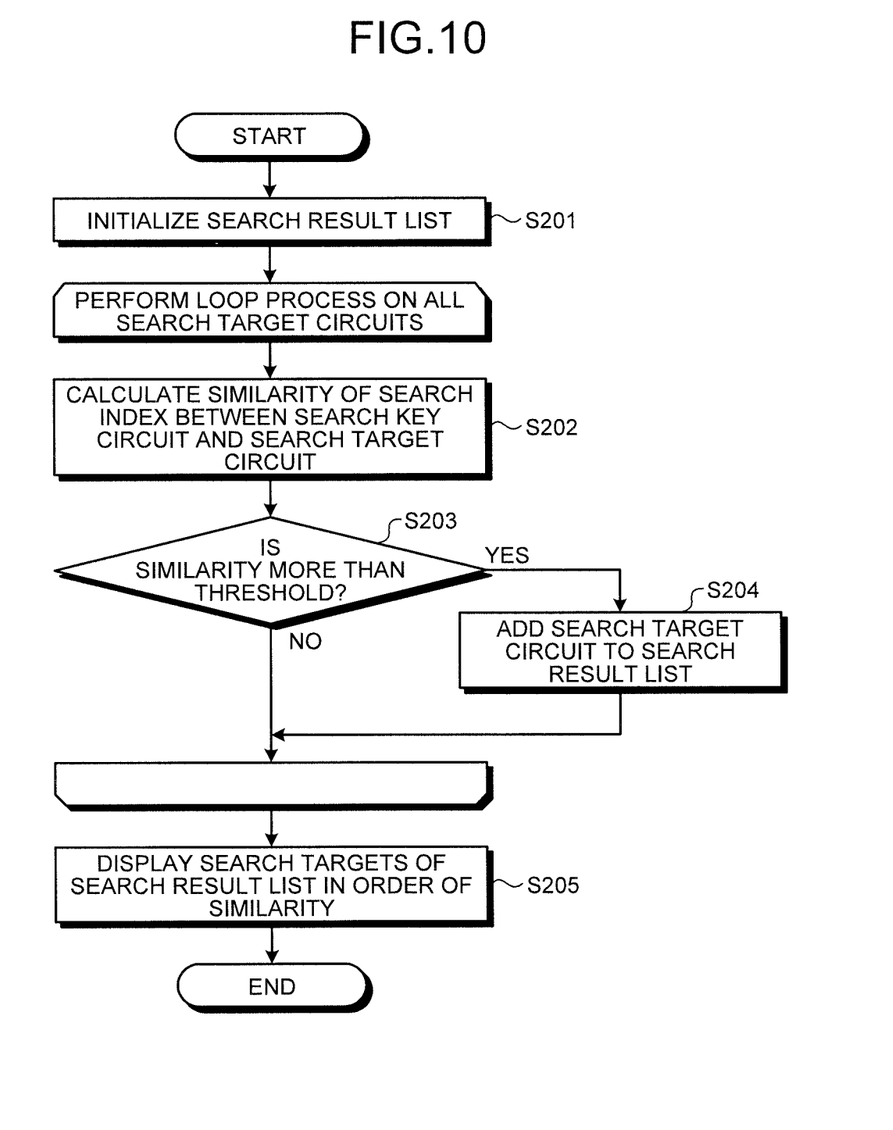
FIG. 10 is a flowchart illustrating the flow of a process of a similar part search and a search result display of the sequence program creation device according to the embodiment.

FIG. 10 is a flowchart illustrating the flow of a process of a similar part search and a search result display of the sequence program creation device according to the present embodiment. The flowchart shown in FIG. 10 depicts details of the processes at Steps S105 and S106 of FIG. 6. The search-result-list creation unit 227 initializes a search result list (Step S201). Thereafter, the similar-part-search processing unit 22 performs a loop process described below on all the search target circuits.

The similarity calculation unit 225 calculates a similarity to a search key circuit for a search target circuit by using a search index specified by the search-index specification unit 224 (Step S202). The search-target-part determination unit 226 determines whether the similarity calculated by the similarity calculation unit 225 is equal to or more than a threshold (Step S203). If the similarity is equal to or more than the threshold (YES at Step S203), the search-target-part determination unit 226 notifies the search-result-list creation unit 227 of the search target circuit. The search-result-list creation unit 227 adds a program part including the search target circuit to the search result list (Step S204). If the similarity is less than the threshold (NO at Step S203), no processing is performed.

When the loop process is ended with respect to all the search target circuits, the search-result display-screen display unit 228 causes the display unit 17 to display the search result list (Step S205). In this case, the program parts included in the search result list are displayed in the order (in the descending order) of the similarities of the search target parts. In this case, as the search conditions (the search area and the search index) are displayed together with the search result list, when desired search results are not obtained, a user can easily determine whether the search conditions have been appropriate.

While a ladder program is taken as an example in the above embodiment, the present invention is also applicable to a case where a sequence program is created by other programming languages such as an ST (Structured Text) or an FBD (Function Block Diagram). In the case of the ST, it suffices that logical similarities and keyword similarities can be specified as an index while graphical similarities cannot be specified as a search index.

According to the present embodiment, circuit similarities are mechanically calculated on the basis of the structure of a program and tendencies of used parts or the like. Therefore, it is possible to search for a program part desired to be utilized without specifying complicated search keys. That is, because it is possible to search for a program part while considering whether the program part has a graphical or logical similarity, an effective programming environment can be provided under various conditions.

INDUSTRIAL APPLICABILITY

As described above, the sequence program creation device according to the present invention is useful in a feature that it is easy to utilize program parts that are partially different from each other in a graphical or logical sense depending on the types or specifications thereof.

REFERENCE SIGNS LIST 10 computer
11 CPU
12 ROM
13 RAM
14 communication unit
15 input unit
16 storage unit
17 display unit
20 program editor
21 editor basic-operation unit
22 similar-part-search processing unit
30 search key circuit
40, 50 search target circuit
51 menu
60 similar-part search screen
61 search-area specification field
62 search-index specification field
63 search execution button
70 search-result display screen
71 list of program parts
80 editor screen
161 program part
211 sequence program under creation
221 search-key input-screen display unit
222 search-key-circuit specification unit
223 search-area specification unit
224 search-index specification unit
225 similarity calculation unit
226 search-target-part determination unit
227 search-result-list creation unit
228 search-result display-screen display unit

The invention claimed is:
1. A sequence program creation device comprising at least a processor equipped with at least one memory and at least one execution unit operating from the memory-stored instructions, which when executed by the processor, carry out the functionality of the sequence program creation device, that is to create a sequence program by graphically arranging constituent elements of a program on an editor screen, the sequence program creation device comprising:
a search-key-circuit specification unit that specifies a search key circuit;

a search-area specification unit that specifies a search area for searching for a circuit similar to the search key circuit;

a search-index specification unit that specifies at least one of a graphical similarity to the search key circuit, a logical similarity to the search key circuit, and a keyword similarity related to the search key circuit as an index in a process of calculating a similarity to the search key circuit;

a similarity calculation unit that calculates a similarity to the search key circuit specified by the search-key-circuit specification unit, on a basis of the index specified by the search-index specification unit, for each circuit included in the search area specified by the search-area specification unit;

a search-target-part determination unit that determines whether the similarity is equal to or more than a predetermined threshold for each circuit for which the similarity calculation unit has calculated the similarity; and a search-result display-screen display unit that displays on a search-result display screen a circuit whose similarity is determined to be equal to or more than the predetermined threshold by the search-target-part determination unit.

2. The sequence program creation device according to claim 1, wherein the search-area specification unit specifies at least one of a part of the sequence program under creation on the editor screen and a created program part as the search area.

3. The sequence program creation device according to claim 2, further comprising a search-result-list creation unit that, when the search-area specification unit specifies a created program part as the search area, creates a list of the created program part including the circuit whose similarity is determined to be equal to or more than the predetermined threshold by the search-target-part determination unit, wherein the search-result display-screen display unit displays the list created by the search-result-list creation unit on the search-result display screen.

4. The sequence program creation device according to claim 3, wherein a circuit selected from the list displayed on the search-result display screen is capable of being arranged on the editor screen.

5. The sequence program creation device according to claim 1, further comprising a search-key input-screen display unit that displays a search-key input screen for creating a circuit by graphically arranging a constituent element of a program, wherein the search-key-circuit specification unit specifies any of a created program part, the sequence program under creation on the editor screen, and a circuit formed on the search-key input screen as the search key circuit.

* * * * *